US009646147B2

(12) United States Patent
Lam et al.

(10) Patent No.: US 9,646,147 B2
(45) Date of Patent: May 9, 2017

(54) METHOD AND APPARATUS OF THREE-TYPE OR FORM AUTHENTICATION WITH ERGONOMIC POSITIONING

(71) Applicant: The United States of America as represented by the Secretary of the Navy, Washington, DC (US)

(72) Inventors: Jack Lam, Burbank, CA (US); Jacky Wong, Chino Hills, CA (US); Bryan Stewart, Oxnard, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 62 days.

(21) Appl. No.: 14/831,520

(22) Filed: Aug. 20, 2015

(65) Prior Publication Data

US 2016/0098550 A1 Apr. 7, 2016

Related U.S. Application Data

(60) Provisional application No. 62/055,928, filed on Sep. 26, 2014.

(51) Int. Cl.
*G06F 21/32* (2013.01)
*G06K 9/00* (2006.01)
(Continued)

(52) U.S. Cl.
CPC ............ *G06F 21/32* (2013.01); *G06F 3/0227* (2013.01); *G06F 21/6218* (2013.01);
(Continued)

(58) Field of Classification Search
CPC ........ G06K 9/00604; H04N 5/33; H04L 9/32; G06F 21/00
See application file for complete search history.

(56) References Cited

U.S. PATENT DOCUMENTS

| 2008/0107309 A1* | 5/2008 | Cerni | G06K 9/00033 |
| | | | 382/115 |
| 2009/0037743 A1* | 2/2009 | Narayanaswami | G07C 9/00158 |
| | | | 713/186 |

(Continued)

*Primary Examiner* — Hadi Armouche
*Assistant Examiner* — Hee Song
(74) *Attorney, Agent, or Firm* — Christopher A. Monsey

(57) ABSTRACT

A system and methods for authenticating a user for access to a system input terminal that includes an infrared imager, a user input terminal, and a processing section including a plurality of processing instructions operable to perform image capture for wrist areas of a user in proximity to an input terminal or other structures requiring authentication and comparison to determine access or deny access. An aspect of an embodiment of the invention permits initial and frequent authentication that reduces or eliminates user action to perform such authentication. Also provided are user interfaces, and additional authentication sections operable with the infrared imager. Alternative embodiments of the invention include a mobile embodiment as well as an embodiment-including a sensor positioned with respect to a user in an operational position where the user is performing a task in relation to an input terminal or structure requiring authentication (e.g. a keyboard).

19 Claims, 16 Drawing Sheets

(51) Int. Cl.
*G06F 3/02* (2006.01)
*G06F 21/62* (2013.01)
(52) U.S. Cl.
CPC ..... *G06K 9/00006* (2013.01); *G06K 9/00013* (2013.01); *G06K 9/00892* (2013.01); *G06K 2009/00932* (2013.01)

(56) References Cited

U.S. PATENT DOCUMENTS

| | | | |
|---|---|---|---|
| 2009/0320106 A1* | 12/2009 | Jones et al. | G06Q 20/1085 726/5 |
| 2010/0038423 A1* | 2/2010 | Kim | G06Q 20/18 235/439 |
| 2011/0169934 A1* | 7/2011 | Pulluru | G06F 21/32 348/77 |
| 2013/0227651 A1* | 8/2013 | Schultz | G06F 21/32 726/4 |
| 2014/0201827 A1* | 7/2014 | Okazaki | G06F 1/1616 726/7 |
| 2015/0010215 A1* | 1/2015 | Fukuda | G06K 9/00013 382/115 |
| 2015/0036893 A1* | 2/2015 | Shinzaki | H04L 9/3231 382/115 |
| 2015/0046990 A1* | 2/2015 | Oberheide | G06F 21/32 726/6 |
| 2015/0356351 A1* | 12/2015 | Saylor | G01S 17/89 348/164 |

* cited by examiner

Acquire Reference Image Module (e.g., see acquire reference image()
from FIG. 10)

A0. Subroutine to initiate graphic package 608 (FIG. 6) for a graphic user interface ("GUI") 413 (FIG. 4) to display a message requesting acquisition of an Administrator login using an Administrator password 500 (FIG. 5)

A1. Subroutine to initiate graphic package 608 (FIG. 6) for a GUI 413 (FIG. 4) to display a message requesting acquisition of a reference image using vein capturing device 420 (FIG. 4)

A2. Subroutine to activate an IR light source 404 (FIG. 4) to direct IR energy towards or onto a first vein image capture position 3 (FIG. 1) from the IR light source 404 (e.g. a finger, a wrist section, etc.)

A3. Subroutine to capture a first image 601 (FIG. 6) of the first vein image capture position 3 associated with an authorized user after IR light activation using a IR camera 403 (FIG. 4) to filter out visible spectrum A4. Subroutine to validate the first image 601 (FIG. 6) to verify that the first image has a clear vein pattern (e.g., a predetermined contrast or resolution of veins in the first image needed for image comparisons)

A5. Subroutine to use a filtering algorithm (e.g., low pass filter) to remove noise from the first image to create a sharper or higher resolution first image 601' (FIG. 6)

A6. Subroutine to activate the IR light source 404 (FIG. 4) to direct IR energy towards or onto the first vein image capture position 3 (FIG. 1)

A7. Subroutine to capture a second image 601 (FIG. 6) of the first vein image capture position 3 using the IR camera 403 (FIG. 4) to filter out visible spectrum A8. Subroutine to validate the second image 601 (FIG. 6) to verify that the second image 601' has the clear vein pattern A9. Subroutine to use the filtering algorithm to remove noise to create a sharper or higher resolution second image 601' (FIG. 6) of the first vein image capture position 3 (FIG. 1)

A10. Subroutine to use a vein pattern recognition algorithm to compare the first image 601' (FIG. 6) with the second image 601' (FIG. 6) to determine a match or no-match where a match indicates a successful authentication of the user A11. Subroutine to save the sharper first image 601' (FIG. 6) into a data library 606 (FIG. 6) or through the network service 607 (FIG. 6) from a transceiver 409 (FIG. 4)

A12. Subroutine to initiate graphic package 608 (FIG. 6) for generating the GUI 413 (FIG. 4) to display a message acknowledging the completion of creating the sharper reference image 601' (FIG. 6)

Fig. 7A

Use Image for Authentication Module (e.g., Refer to perform authentication() from FIG. 10)

B1. Subroutine to initiate authentication application 605 (FIG. 6) to authenticate an authorized user system access
B2. Subroutine to initiate a graphic package 608 (FIG. 6) for a graphic user interface ("GUI") 413 (FIG. 4) to display a message requesting acquisition of authentication image using a vein image capturing device 420 (FIG. 4)
B3. Subroutine to activate an IR light source 404 (FIG. 4) to direct IR energy towards or onto a vein image capture position 3 (FIG. 1) (e.g. a finger, a wrist section, etc.)
B4. Subroutine to capture a third image 601 (FIG. 6) of a third vein image capture position 3 associated with the authorized user using a IR camera 403 (FIG. 4) to filter out visible spectrum
B5. Subroutine to validate the third image 601 (FIG. 6) to verify that the third image has a clear vein pattern (e.g., a predetermined contrast or resolution of veins in the first image needed for image comparisons)
B6. Subroutine to use a filtering algorithm (e.g., low pass filter) to remove noise from the third image to create a sharper or higher resolution third image 601' (FIG. 6)
B7. Subroutine to use a vein pattern recognition algorithm to compare the third image 601' (FIG. 6) with the sharper first image 601' (FIG. 6) stored in a data library 606 (FIG. 6) or through a network service 607 (FIG. 6) received from a transceiver 409 (FIG. 4) to determine a match or no-match where a match indicates a successful authentication of the user
B8. Subroutine to initiate the graphic package 608 (FIG. 6) for generating the GUI 413 (FIG. 4) to display a message acknowledging the completion of authentication of the user

Fig. 7B

Three Form Authentication Module (Refer to perform authentication())
from FIG. 10)

C1. Subroutine to initiate an authentication application 605 (FIG. 6) to authenticate an authorized user system access
C2. Subroutine to initiate a graphic package 608 (FIG. 6) for a graphic user interface ("GUI") 413 (FIG. 4) to display a message requesting insertion of a IC card into a card reader 411 (FIG. 4)
C3. Subroutine to verify the IC card is inserted in the card reader 411 (FIG. 4)
C4. Subroutine to compare the IC card PKI information with user information stored in a data library 606 (FIG. 6) or through the network service 607 (FIG. 6) received from the transceiver 409 (FIG. 4)
C5. Subroutine to initiate the graphic package 608 (FIG. 6) for the GUI 413 (FIG. 4) to display a message acknowledging completion of successful pairing of the PKI information on both the IC card and the user information stored in the data library 606 (FIG. 6)
C6. Subroutine to initiate the graphic package 608 (FIG. 6) for the GUI 413 (FIG. 4) to display a message requesting a Password or Pin from the user
C7. Subroutine to compare the password or the pin with the password or the pin information resided in either the PKI information of the IC card, the information stored in the data library 606 (FIG. 6), or through the network service 607 (FIG. 6) received from the transceiver 409 (FIG. 4)
C8. Subroutine to initiate the graphic package 608 (FIG. 6) for the GUI 413 (FIG. 4) to display a message acknowledging completion of successful pairing of the password information
C9. Subroutine to initiate the graphic package 608 (FIG. 6) for the GUI 413 (FIG. 4) to display a message requesting acquisition of an authentication image using a vein image capturing device 420 (FIG. 4)
C10. Subroutine to activate an IR light source 404 (FIG. 4) to direct IR energy towards or onto a vein image capture position 3 (FIG. 1)
C11. Subroutine to capture a third image 601 (FIG. 6) of the vein image capture position 3 associated with the authorized user after IR light activation using a IR camera 403 (FIG. 4) to filter out visible spectrum
C12. Subroutine to validate the third image 601 (FIG. 6) to verify the third image of vein position 3 (FIG. 1) has a clear vein pattern (e.g., a predetermined contrast or resolution of veins in the first image needed for image comparisons)
C13. Subroutine to use a filtering algorithm (e.g., low pass filter) to remove noise from the third image to create a sharper or higher resolution third image 601' (FIG. 6) of the vein position 3 (FIG. 1)

Fig. 7C

C14. Subroutine to use a vein pattern recognition algorithm to compare the third image 601' (FIG. 6) with the first image 601' (FIG. 6) stored in the data library 606 (FIG. 6) to determine a match or no-match where a match indicates a successful authentication of the user
C15. Subroutine to initiate graphic package 608 (FIG. 6) for generating a GUI 413 (FIG. 4) to display a message acknowledging the successful authentication of the user
C16. Subroutine to initiate graphic package 608 (FIG. 6) for generating a GUI 413 (FIG. 4) to display a message acknowledging the completion of authentication through the three acknowledgement messages

Fig. 7D

Additional Fingerprint Identification as a two-location biometrics authentication module S1. Subroutine to initiate authentication application 605 (FIG. 6) to authenticate an authorized user system access
S2. Subroutine to initiate a graphic package 608 (FIG. 6) for a graphic user interface ("GUI") 413 (FIG. 4) to display a message requesting a first acquisition of an authentication image using a vein image capturing device 420 (FIG. 4)
S3. Subroutine to activate an IR light source 404 (FIG. 4) to direct IR energy towards or onto a vein image capture position 3 (FIG. 1 from IR light source 404 (e.g. a finger, a wrist section, etc.)
S4. Subroutine to capture a third image 601 (FIG. 6) of the first vein image capture position 3 associated with an authorized user after IR light activation using a IR camera 403 (FIG. 4) to filter out visible spectrum
S5. Subroutine to validate the third image 601 (FIG. 6) to verify that the vein first image has a clear vein pattern (e.g., a predetermined contrast or resolution of veins in the first image needed for image comparisons)
S6. Subroutine to use filtering algorithm (e.g., low pass filter) to remove noise from the third image to create a sharper or higher resolution third image 601' (FIG. 6)
S7. Subroutine to use a vein pattern recognition algorithm to compare the third image 601 (FIG. 6) with the stored in a data library 606 (FIG. 6) or through a network service 607 (FIG. 6) received from a transceiver 409 (FIG. 4) to determine a match or no-match where a match indicates a successful authentication of the user
S8. Subroutine to initiate the graphic package 608 (FIG. 6) for generating the GUI 413 (FIG. 4) to display a message requesting a second acquisition of authentication image using a camera 402 (FIG. 4)
S9. Subroutine to capture a fourth image 601 (FIG. 6) of finger print capture position 8 associated with the authorized user in visible spectrum using a camera 402 (FIG. 6) from a second biometrics device 7 (FIG. 1)
S10. Subroutine to validate the fourth image 601 (FIG. 6) to verify the fourth image has a clear finger print pattern from the second biometrics device 7 (FIG. 1)
S11. Subroutine to use a finger print recognition algorithm to compare the fourth image with a reference image stored in the data library 606 (FIG. 6) or through the network service 607 (FIG. 6) received from the transceiver 409 (FIG. 4)
S12. Subroutine to initiate the graphic package 608 (FIG. 6) for generating the GUI 413 (FIG. 4) to display a message acknowledging the completion of authentication of the user

Fig. 8

Additional finger vein identification as a two-location vein biometrics authentication module R1. Subroutine to initiate authentication application 605 (FIG. 6) to authenticate an authorized user system access
R2. Subroutine to initiate a graphic package 608 (FIG. 6) for generating a graphic user interface ("GUI") 413 (FIG. 4) to display a message requesting a first acquisition of authentication image using a first vein capturing device 420 (FIG. 4)
R3. Subroutine to activate a first IR light source 404 (FIG. 4) to direct IR energy towards or onto a first vein image capture position 3 (FIG. 1) from IR light source 404 (e.g., a finger, a wrist section, etc.)
R4. Subroutine to capture a third image 601 (FIG. 6) of the first vein capture position 3 associated with the authorized user after IR light activation using a first IR camera 403 (FIG. 4) to filter out visible spectrum
R5. Subroutine to validate the third image 601 (FIG. 6) to verify the third image 601 of the first vein position 3 (FIG. 1) has a clear vein pattern
R6. Subroutine to use a filtering algorithm to remove noise to create a sharper or higher resolution third image 601' (FIG. 6) of the first vein position 3 (FIG. 1)
R7. Subroutine to use a vein pattern recognition algorithm to compare the third image 601' (FIG. 6) with a first reference image 601' (FIG. 6) stored in a data library 606 (FIG. 6) or through a network service 607 (FIG. 6) received from a transceiver 409 (FIG. 4) to determine a match or no-match where a match indicates a successful authentication of the user
R8. Subroutine to initiate the graphic package 608 (FIG. 6) for the GUI 413 (FIG. 4) to display a message requesting a second acquisition of authentication image using a second vein capturing device 420 (FIG. 4) with a second vein position 3 (FIG. 1)
R9. Subroutine to activate a second IR light source 404 (FIG. 4) to direct IR energy towards or onto a second vein image capture position 3 (FIG. 1) from IR light source 404 (e.g., a finger, a wrist section, etc.)
R10. Subroutine to capture a fourth image 601 (FIG. 6) of the second vein image capture position 3 associated with the authorized user after IR light activation using a second IR camera 403 (FIG. 4) to filter out visible spectrum
R11. Subroutine to validate the fourth image 601 (FIG. 6) to verify the second image (FIG. 1) has the clear vein pattern

Fig. 9A

R12. Subroutine to use the filtering algorithm to remove noise to create a sharper or higher resolution fourth image 601' (FIG. 6) of the second vein position 3 (FIG. 1)
R13. Subroutine to use the vein pattern recognition algorithm to compare the fourth image 601' (FIG. 6) with a second reference image 601' (FIG. 6) stored in the data library 606 (FIG. 6) or through the network service 607 (FIG. 6) received from the transceiver 409 (FIG. 4) to determine a match or no-match where a match indicates a successful authentication of the user
R14. Subroutine to initiate the graphic package 608 (FIG. 6) for the GUI 413 (FIG. 4) to display a message acknowledging the completion of authentication of the user

Fig. 9B

Software function
F1. main()
F2. acquire reference image()
    F3. receive request for acquisition()
    F4. request image()
        F5. take image from camera 1()
        F6. take image from camera 2()
    F7. request test image()
        F8. take image from camera 1()
        F9. take image from camera 2()
    F10. image enhancement()
        F11. filter noise()
        F12. sharpen image()
    F13. compare image with test image()
        F14. pattern matching()
    F15. acknowledge match/no match()
    F16. show result on graphic user interface()
    F17. save reference image to storage unit()
F18. perform authentication()
    F19. verifyICcard inserted()
    F20. request user access data input()
    F21. compare user access data()
    F22. request image()
        F23. take image from camera 1()
        F24. take image from camera 2()
    F25. compare image with reference()
        F26. compare image 1()
        F27. compare image 2()
    F28. acknowledge match/no match()
    F29. show result on graphic user interface()

Fig. 10

METHOD AND APPARATUS OF THREE-TYPE OR FORM AUTHENTICATION WITH ERGONOMIC POSITIONING

CROSS-REFERENCE TO RELATED APPLICATIONS

The present application claims priority to U.S. Provisional Patent Application Ser. No. 62/055,928, filed Sep. 26, 2014, entitled "METHOD AND APPARATUS OF THREE-FORM AUTHENTICATION WITH ERGONOMIC POSITIONING," the disclosure of which is expressly incorporated by reference herein.

STATEMENT REGARDING FEDERALLY SPONSORED RESEARCH OR DEVELOPMENT

The invention described herein was made in the performance of official duties by employees of the Department of the Navy and may be manufactured, used and licensed by or for the United States Government for any governmental purpose without payment of any royalties thereon. This invention (Navy Case 200,093) is assigned to the United States Government and is available for licensing for commercial purposes. Licensing and technical inquiries may be directed to the Technology Transfer Office, Naval Surface Warfare Center Port Hueneme, Calif.

BACKGROUND AND SUMMARY OF THE INVENTION

Biometric devices which require awkward movement, such as tilting a human eye close to a retina scanner or putting a palm on a sensor pad, is a human systems barrier to implementing biometrics signature collection with respect to frequent authentication associated with applications such as computer terminals, ATM terminals for banking, etc. Existing systems are not compatible with natural movements, posture, etc of a user with respect to their performance of tasks relative to applications such as cybersecurity, input terminals, etc. Therefore, there is a need for a system that permits authentication without or minimizing excess or additional movement as well as enabling authentication while a task is performed. Existing systems are ergonomically inefficient, require extra movement or disruption to workflow or activities, and create an increased risk of unauthorized user impersonation. Exemplary authentication systems can include authentication designs and methods with one or more biometrics authentication and an authentication or identity token incorporating integrated circuit (IC) reading authentication. In one embodiment of the present invention, a human arm (and/or hand) can be positioned in an ergonomic position with respect to a biometric device in accordance with various embodiments of the invention. Another embodiment can incorporate multiple biometrics device units. Single or multiple biometric units facilitate capture of biometrics signature(s) in proximity to user operation or positioning to an input device (e.g., keyboard, keypad, touch screen, etc.) and an IC reader device in proximity to a user (e.g., arm's length) to receive password and user access data information from such a user to enable a three-form authentication. Image processing of veins of a user's exposed body can be used with the invention such as wrist area, palm area, and/or finger areas. Such image processing can incorporate an infrared camera, infrared imager (to improve contrast or produce sharper vein images), pattern recognition systems, a data store for storing a reference image, and a system which compares a reference image with an image captured by the infrared camera using the pattern recognition systems (e.g., creating an infrared map of veins by contrasting veins versus surrounding surface). Additional elements can include remote transmission to an authentication server as well as a portable design e.g., one that straps or positions with respect to an area of a human or biological structure having veins (e.g., animals) or aspects that can be thermally mapped which interacts with a structure such as a door or input terminal that requires access authentication. Another alternative embodiment can include a structure that positions an embodiment of the invention with respect to a portion of a biological structure e.g. human ear or forehead, top of arm or hand, etc and produces a thermal map which is authenticated against a stored thermal map associated with the biological structure and authorized user.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which:

FIGS. 7a-7d show an overview of a set of simplified software modules in accordance with one embodiment of the invention;

FIG. 8 shows a description of an overview of a simplified software exemplary embodiment with an additional fingerprint identification as a two-location biometrics authentication module in accordance with one embodiment of the invention;

FIGS. 9A and 9B show a description of an overview of a simplified software exemplary embodiment with an additional finger vein identification mode as a two-location or type biometrics authentication module in accordance with one embodiment of the invention;

FIG. 10 shows an exemplary simplified computer source code representation in accordance with an embodiment of the invention operable to execute processing such as described.

DETAILED DESCRIPTION OF THE DRAWINGS

The embodiments of the invention described herein are not intended to be exhaustive or to limit the invention to precise forms disclosed. Rather, the embodiments selected for description have been chosen to enable one skilled in the art to practice the invention.

Figure 1:
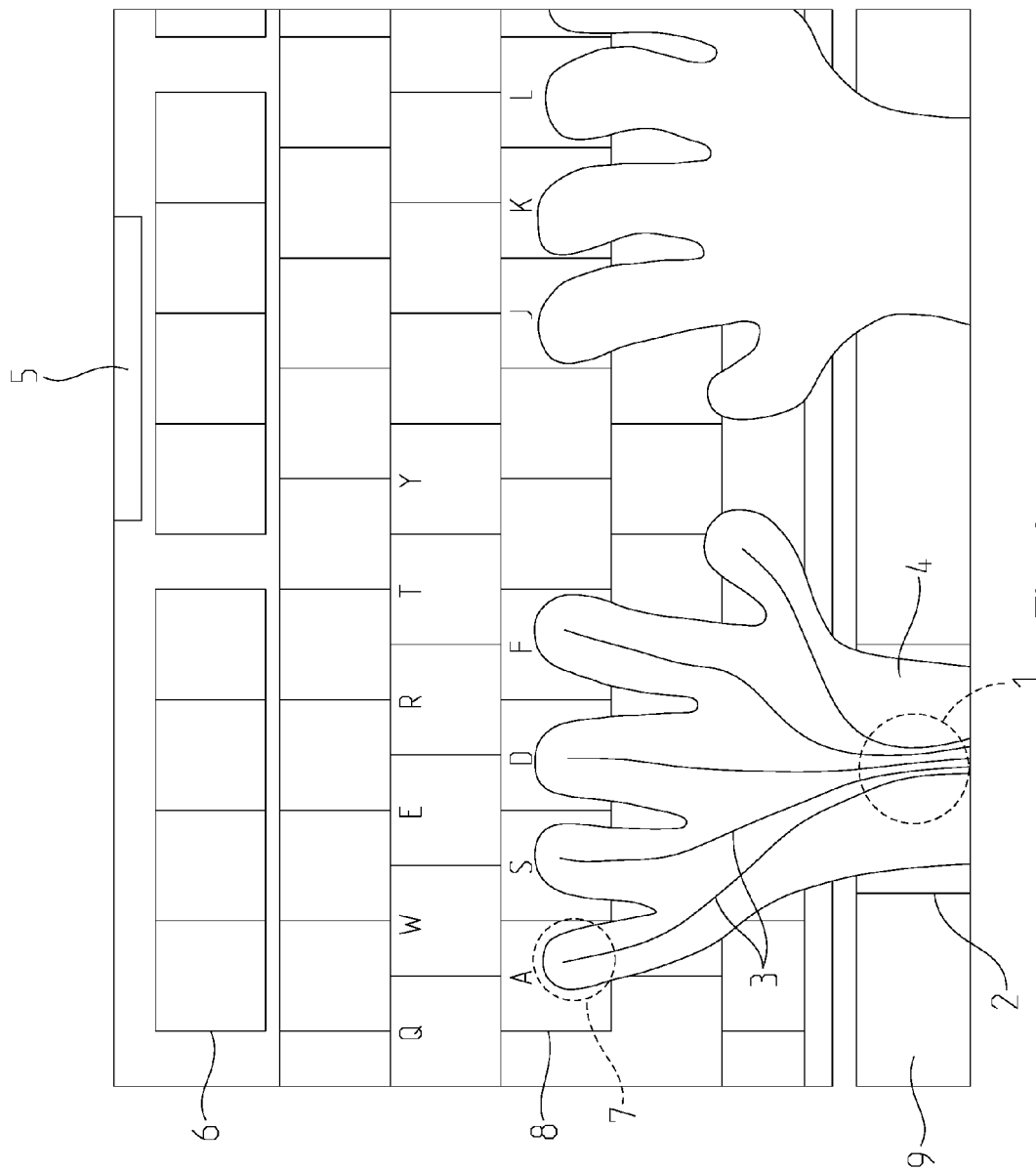
FIG. 1 shows exemplary biometrics devices in operational positions relative to a user and an input device that requires authentication for access in exemplary ergonomically and workflow compatible relationships.

FIG. 1 shows an exemplary biometrics device in an operational and workflow compatible position relative to a user on an input device 6 with an ergonomic support in accordance with one embodiment of the invention. A human arm 4 with a designated vein position 3 is shown resting in an operational position relative to the input device 6 positioned relative to an IR camera 1. This vein position 3, input device 6 and IR camera 1 relationship enables the user's arm 4 to be positioned with respect to a biometric device mounting structure 2 coupled to an ergonomic support 9 that is connected or positioned with respect to the input device 6. An IC card reader 5 is shown connected to the input device 6. The human arm 4 with a second biometrics device 7 is shown resting in operational position with respect to the input device 6 where the second biometrics device is positioned relative to another section of the human arm 4 (e.g., fingers); the second biometrics device 7 is supported by another mounting structure 8 (e.g., a keyboard key that the user's finger operates in a predetermined operating position (initial typing position in this case) can be connected to the input device 6.

An alternative embodiment can include an exemplary biometrics device, e.g., IR camera 1, positioned with a mounting structure, e.g., a variant of biometric device structure 2, placed under or positioned with respect to one or a plurality of exposed body locations. Another alternative embodiment can include another IR camera as another biometrics device 2 configured to capture a vein image on finger for use with various embodiments of the invention. Yet another alternative embodiment includes an IR Camera 1 configured to capture a surface image of a section of a user arm 4 for user or operator authentication. Another alternative embodiment can include a sliding support structure (not shown) that mounts the biometric device 1 which permits movement of the support structure to facilitate movement of a user's arm with respect to the input device.

Figure 2:
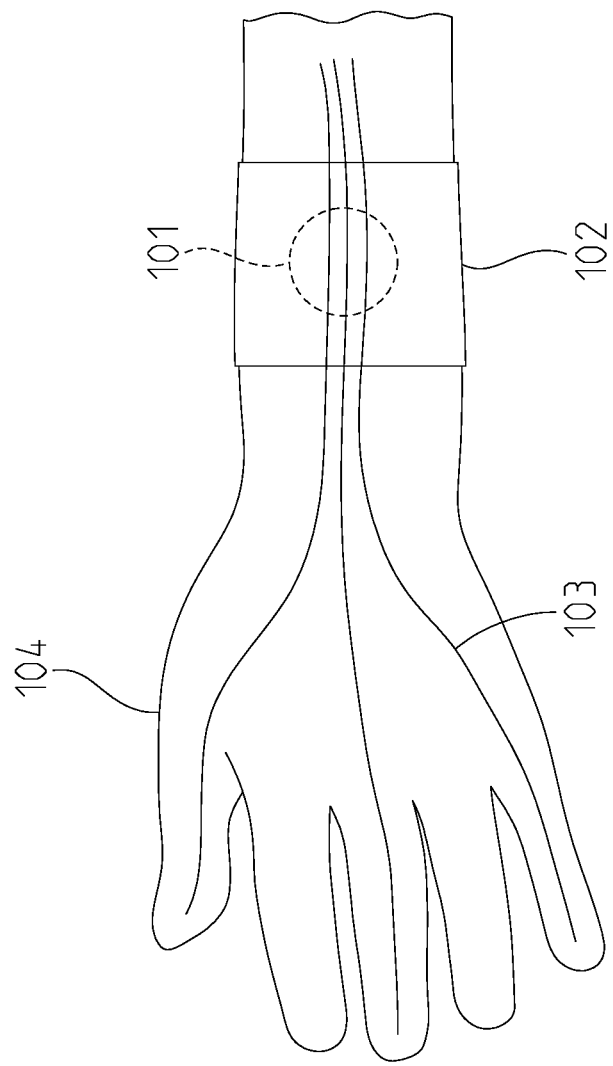
FIG. 2 shows an exemplary biometrics device in operational position relative to a user.

FIG. 2 shows an exemplary biometrics device in a mobile application operational position relative to a user. A human arm 104 with a vein (or vein pattern) 103 is shown with biometrics device 101 coupled to the arm 104 with a mounting structure 102 (e.g. a wrist strap). The FIG. 2 embodiment permits a mobile activity, which can include a short-range transmitter (not shown) included in the mounting structure 102 that permits interaction with a structure or system (not shown) that requires authentication e.g., automated teller machine (ATM), point of sale (POS) system, security system, communication system, etc. The short-range transmitter (not shown) can communicate with a receiver within the structure or system that requires authentication by transmitting an infrared image of the user's vein structures 103 to an authentication server (not shown). Another embodiment can add additional authentication systems, which can include systems such as IC cards and personally identifiable numbers, passwords (including voice recognition passwords), etc.

Figure 3:
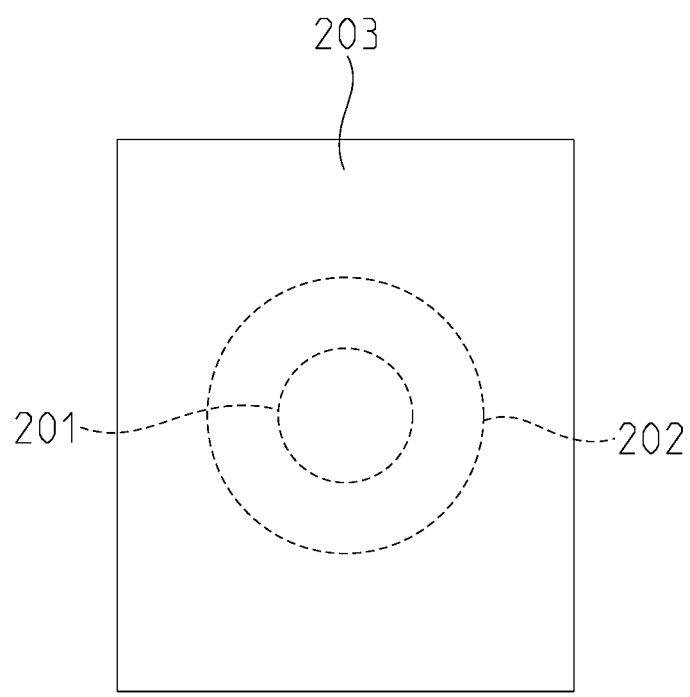
FIG. 3 shows an exemplary biometrics device.

FIG. 3 shows a biometrics device that can be used with an embodiment such as, for example, the FIG. 2 embodiment. A camera 201 and a light source 202 are shown embedded on a mounting structure 203.

Figure 4:
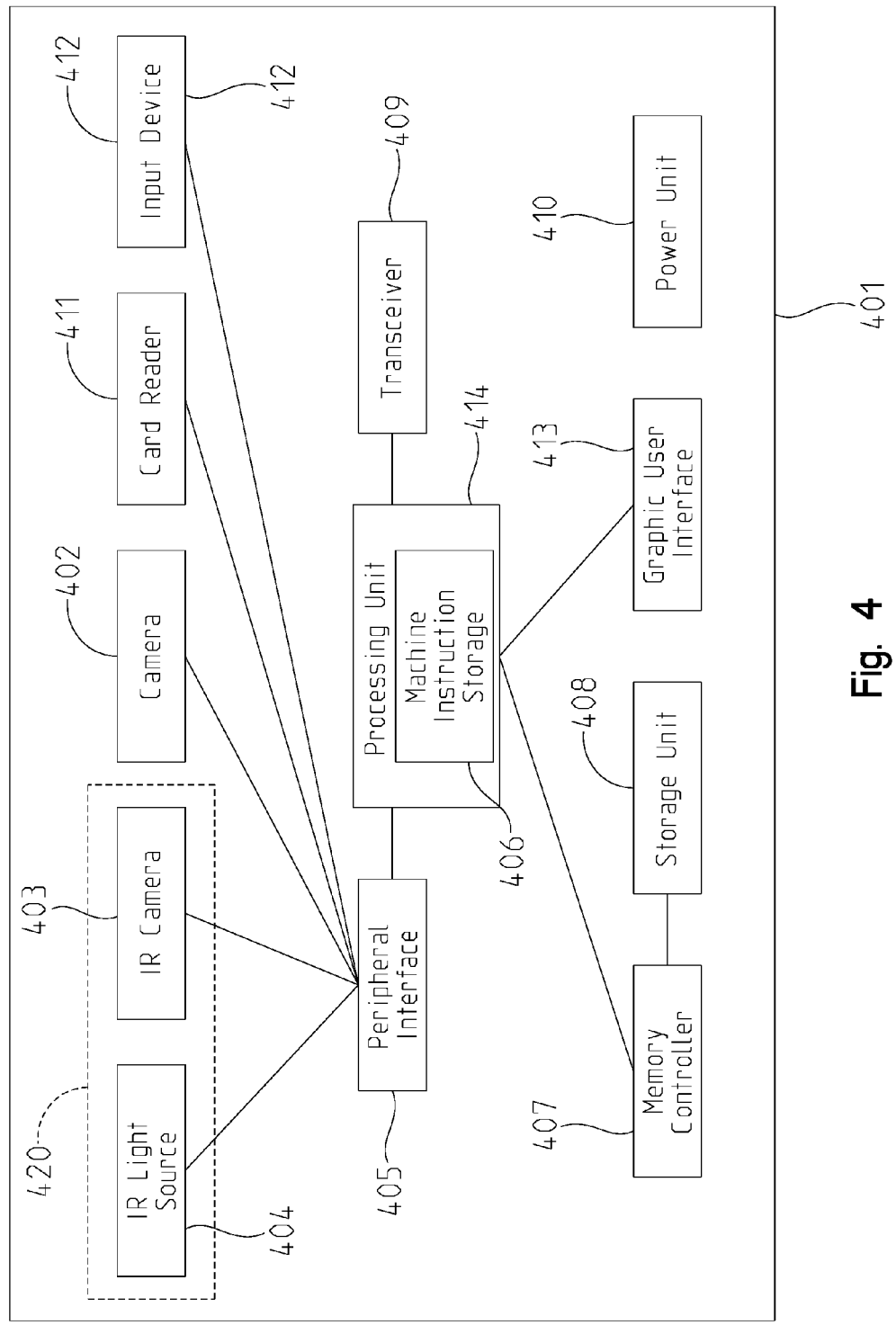
FIG. 4 shows an exemplary functional block diagram of an exemplary embodiment of a system overview in accordance with one embodiment of the invention.

FIG. 4 shows a functional systems block diagram of one embodiment of the invention. A device structure 401 can include a camera 402, an IR camera 403, and an IR light source 404 which, when combined, create a vein capturing device 420. The device structure also includes a card reader 411, an input device 412, a transceiver 409, a power unit 410, a peripheral interface 405, a processing unit 406, a memory controller 407, a storage unit 408, and a display with user interfaces or information, e.g., a graphic user interface 413. Peripheral interface 405 can be connected to the camera 402, the IR camera 403, the infrared light source 404, the card reader 411, and the input device 412 on the device structure 401. Peripheral interface 405 is also shown connected to a processing unit 406 and memory controller 407. Processing unit 406 can be connected to the memory controller 407 and a graphical user interface 413. Processing unit 406 is also shown connected to the transceiver 409. Memory controller 407 can be connected to a storage unit inside a central device 401. Machine readable instructions in machine instruction storage 414 configured to be executed by a processor to control aspects of the invention e.g., controller, camera, etc., can be stored and/or executed inside in in by the processing unit 406.

Figure 5A:
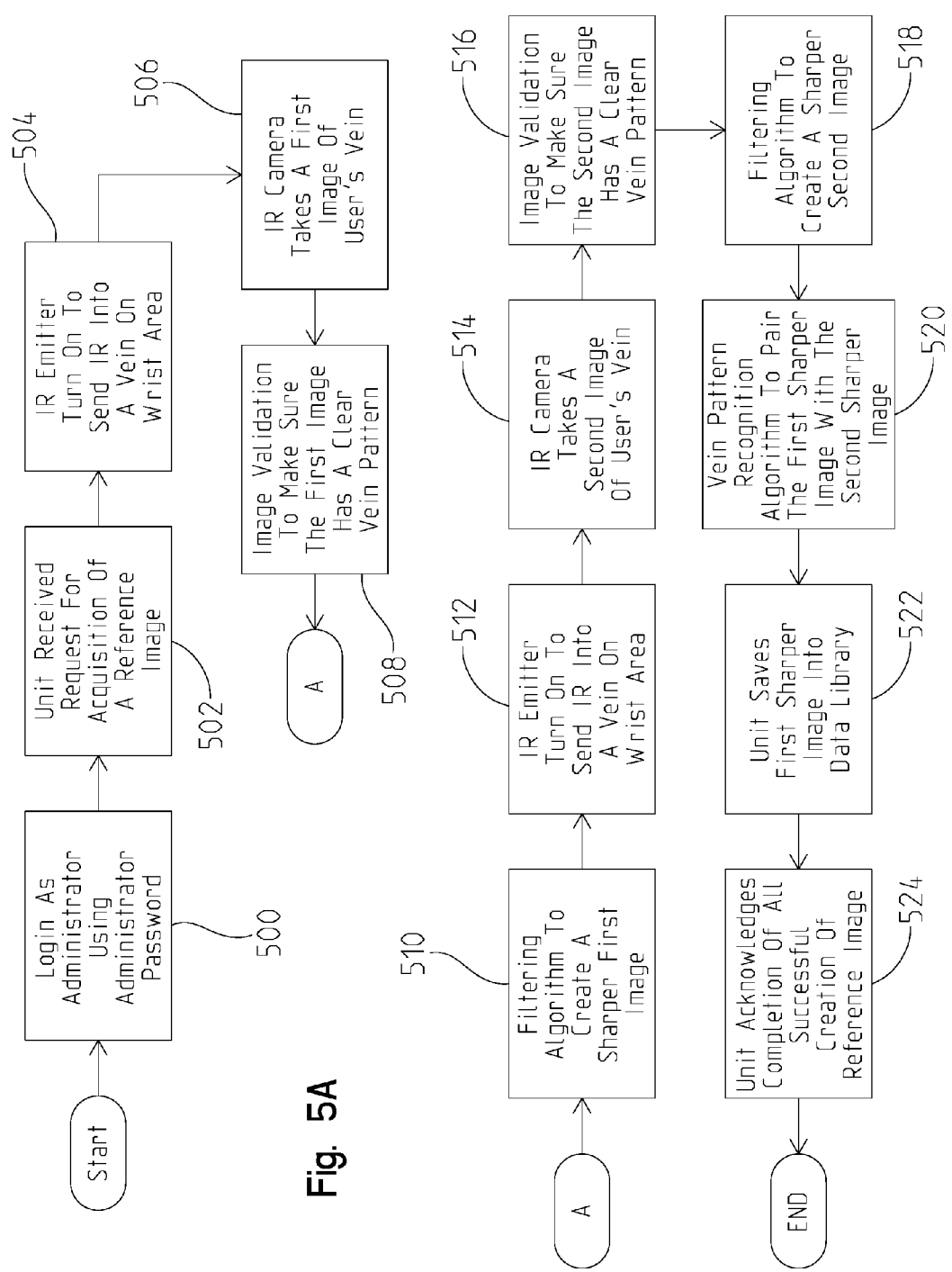
FIG. 5a shows one method of operation for creating a reference image for authentication through an exemplary embodiment of the invention.

FIG. 5a shows one method of operation for creating a reference image for authentication through an exemplary embodiment of the invention. At step 500, an administrator authorized to create an authentication record including a reference image inputs authorization password. At step 502 shows a device receiving a request for acquisition of a reference image. At step 504, a light source is activated to direct or send infrared light onto a user's wrist area. At step 506, an IR camera captures a first infrared image of the user's wrist area. At step 508, the device validates the first infrared image of a vein pattern on the user wrist area to determine that the first infrared image has a predetermined resolution and image clarity of the user's wrist area including the vein pattern. At step 510, the device executes a filtering algorithm to create a sharper first infrared image. At step 512, a light source is activated to send or direct infrared light on the human wrist area. At step 514, the IR camera captures a second infrared image of the user's wrist area. At step 516, the device validates the second infrared image of a vein pattern on the human wrist area to include verifying a clear vein pattern with predetermined resolution and image clarity. At step 518, the device executes the filtering algorithm to create a sharper second infrared image. At step 520, the device executes a vein pattern recognition algorithm and subroutines to compare the first sharper vein image with the second sharper vein image. Note step 520, if there is no match between the first and the second sharper vein image the device will repeat steps 502 to 520 until match is successful. At step 522, the device stores the first sharper image into a data library. At step 524, the device acknowledges completion of successful creation of the reference image.

Figure 5B:
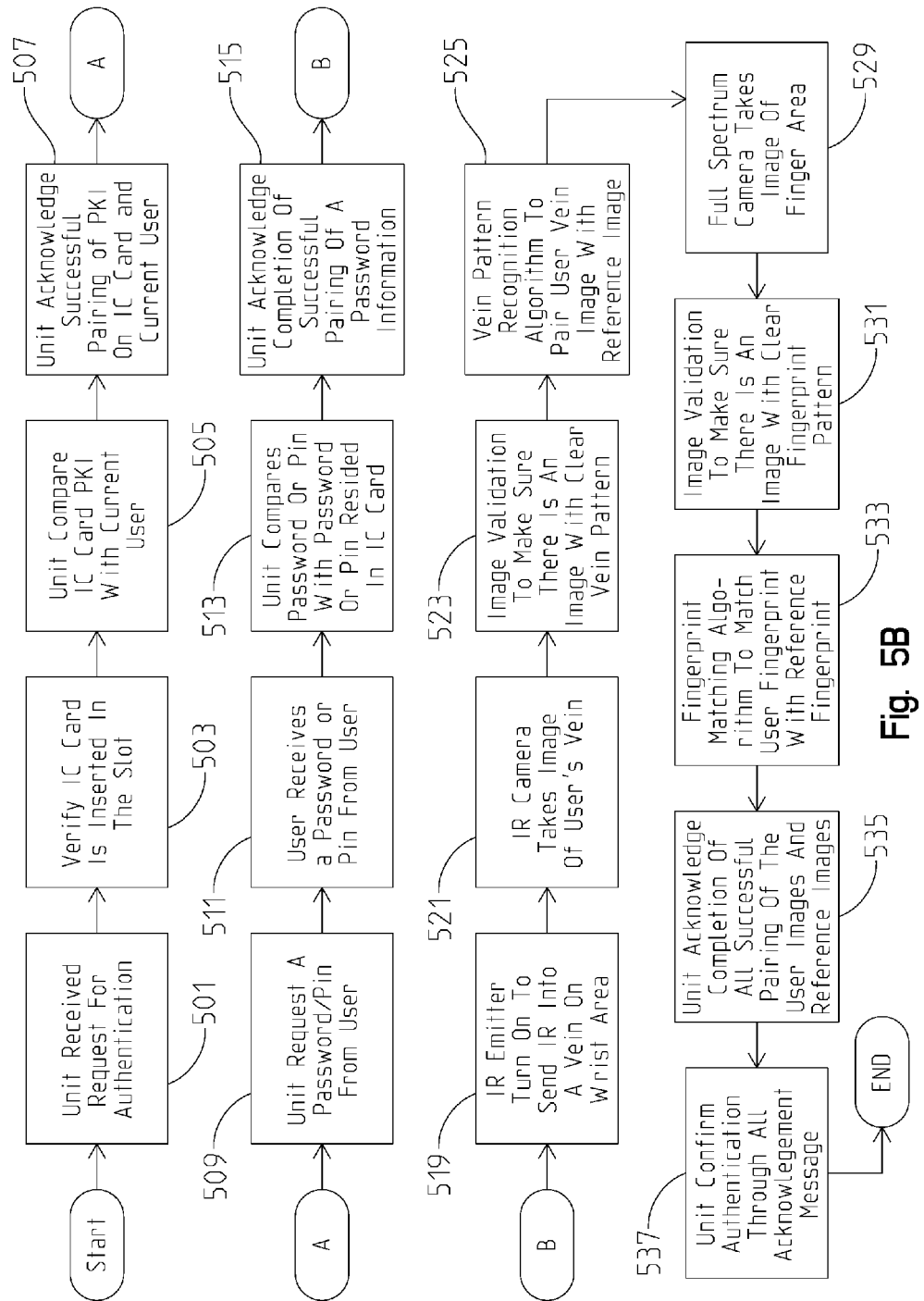
FIG. 5b shows an exemplary functional block diagram of a method of operation for a three form authentication with multiple biometrics pattern recognition which includes an exemplary embodiment of the invention.

FIG. 5b shows one exemplary method of operation for three-form (or type) authentication with multiple biometrics pattern recognitions in accordance with an embodiment of the invention. At step 501, request for authentication is sent from a processing unit, or remotely through a transceiver, to the device. At step 503, an IC card inserted in a reader is verified. At step 505, user access data information is compared inside the IC card with current user information inside a storage unit. At step 507, completion of successful pairing of the user access data information on both the IC card and the current user information is acknowledged. At step 509, password information is requested from the user. At step 511, user provides password information to the device. At step 513, password information from the user and the password information as part of the user access data information inside the IC card is compared. At step 515, completion of successful pairing of password information on both the user and user access data information inside the IC card is acknowledged. At step 519, a light source is activated to direct or send infrared light onto a user's wrist area. Note step 519 can be omitted but can also be used to create a sharper or different image (from mere passive imaging) of a user's arm area or area of interest with vein or thermal emissive/absorption areas. At step 521, an IR camera captures a first infrared image of the user's wrist area. Step 521 can include pattern recognition and signal processing needed to create a pattern data for matching with reference patterns. At step 523, the device validates the infrared image of a vein pattern on the user's wrist area to determine that the infrared image has a predetermined resolution and image clarity of the user's wrist area including the vein pattern. At step 525, the device executes a vein pattern recognition algorithm to pair the vein image with a reference image of the user access data. Note step 525, if there is no match between the vein image and the reference image then the device will repeat steps 519 to 525 until match is successful. At step 529, a camera captures an image of the user's fingerprint. At step 531, the image of the user's fingerprint is validated to include a clear fingerprint pattern. At step 533, the device executes a fingerprint matching algorithm to pair the fingerprint image with the reference image of the user access data. Note step 533, if there is no match between the fingerprint image and the reference image the device will repeat steps 529 to 533 until match is successful. At step 535, completion of all successful pairing of the plurality of images with the plurality reference images is acknowledged. At step 537, confirmation of authentication of the user through a plurality of messages is acknowledged.

Figure 6:
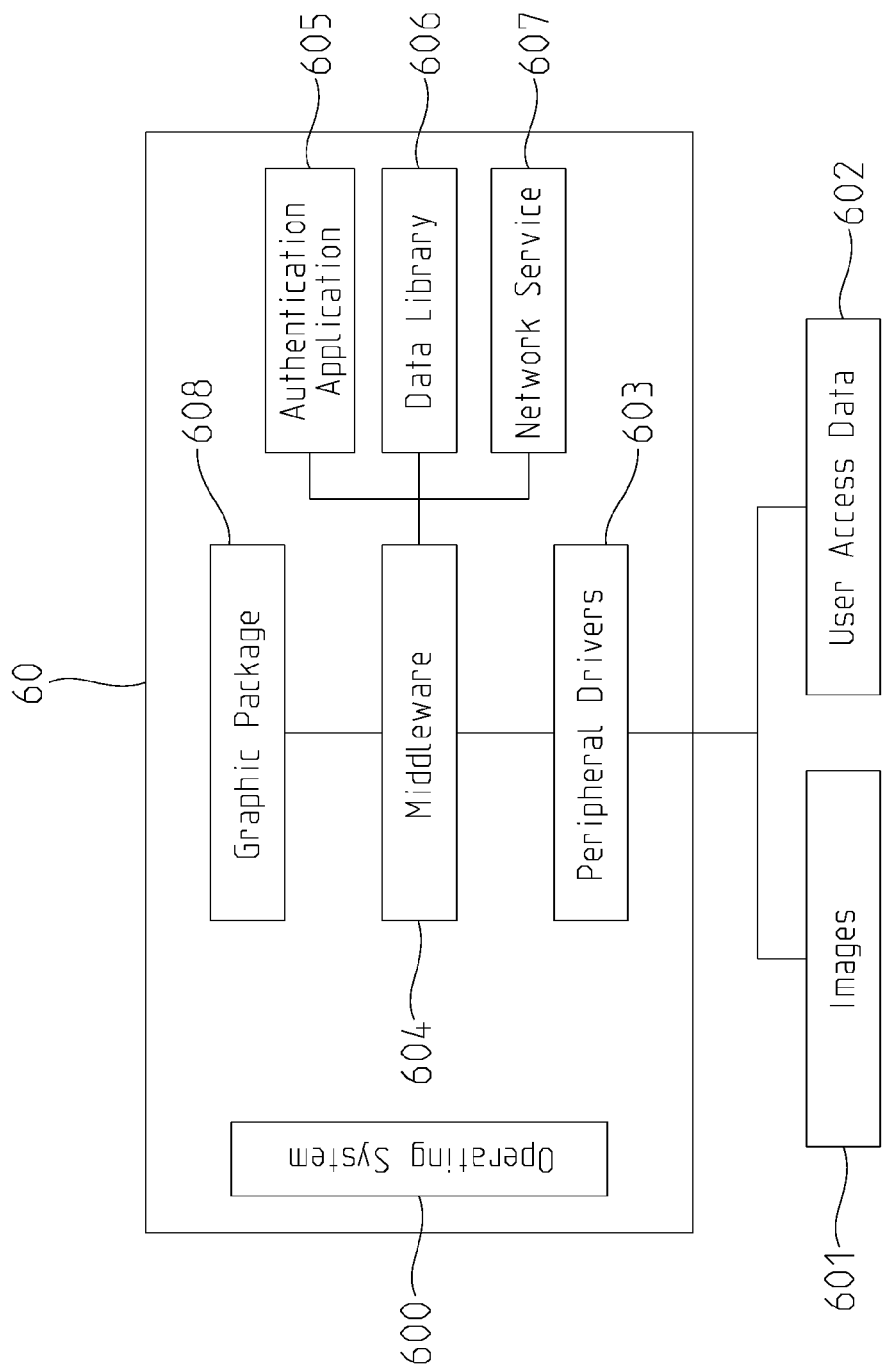
FIG. 6 shows an exemplary functional description of machine readable instructions in accordance with an embodiment of the invention adapted to interact with an exemplary processing section.

FIG. 6 shows a plurality of software applications used with an embodiment of the invention. The device structure 401 can include software or machine instructions stored in machine readable instruction storage systems, e.g. storage unit 408, such as an operating system 600, a plurality of peripheral drivers 603, a middleware 604, an authentication application program 605, a data library 606, a network service 607, and a graphic package software 608 for generating at least in part displays or graphical user interfaces on graphical user interface 413. The plurality of peripheral drivers 603 can, e.g., receive and interpret a plurality of biometrics images 601 and a plurality of user access data 602 from peripherals, e.g., USB port, IR camera 403, etc, and transfer such peripheral data inputs or input signal inputs onto device structure 401 signal or data base (not shown).

FIG. 7A shows an overview of a set of simplified software modules in accordance with one embodiment of the invention. An acquire reference image module can include processing sequences operable for the following functions with respect to equipment items in accordance with an embodiment of the invention: Subroutine A0 configured to initiate a graphic package 608 (FIG. 6) for a graphic user interface ("GUI") 413 (FIG. 4) to display a message requesting acquisition of an Administrator login using an Administrator password 500 (FIG. 5). Subroutine A1 configured to initiate the graphic package 608 (FIG. 6) for the GUI 413 (FIG. 4) to display a message requesting acquisition of a reference image using a vein capturing device 420 (FIG. 4); Subroutine A2 configured to activate an IR light source 404 (FIG. 4) to direct IR energy towards or onto a first vein image capture position 3 (FIG. 1) from the IR light source 404 (e.g. a finger, a wrist section, etc.); Subroutine A3 configured to capture a first image 601 (FIG. 6) of the first vein image capture position 3 associated with an authorized user after IR light activation using a IR camera 403 (FIG. 4) to filter out visible spectrum; Subroutine A4 configured to validate the first image 601 (FIG. 6) to verify that the first image has a clear vein pattern (e.g., a predetermined contrast or resolution of veins in the first image needed for image comparisons); Subroutine A5 configured to use a filtering algorithm (e.g., low pass filter) to remove noise from the first image to create a sharper or higher resolution first image 601' (FIG. 6); Subroutine A6 configured to activate the IR light source 404 (FIG. 4) to direct IR energy towards or onto the first vein image capture position 3 (FIG. 1); Subroutine A7 configured to capture a second image 601 (FIG. 6) of the first vein image capture position 3 using the IR camera 403 (FIG. 4) to filter out visible spectrum; Subroutine A8 configured to validate the second image 601 (FIG. 6) to verify that the second image 601' has the clear vein pattern; Subroutine A9 configured to use the filtering algorithm to remove noise to create a sharper or higher resolution second image 601' (FIG. 6) of the first vein image capture position 3 (FIG. 1); Subroutine A10 configured to use a vein pattern recognition algorithm to compare the first image 601' (FIG. 6) with the second image 601' (FIG. 6) to determine a match or no-match where a match indicates a successful authentication of the user; Subroutine A11 configured to save the sharper first image 601' (FIG. 6) into a data library 606 (FIG. 6) or through the network service 607 (FIG. 6) from a transceiver 409 (FIG. 4); and Subroutine A12 configured to initiate graphic package 608 (FIG. 6) for generating the GUI 413 (FIG. 4) to display a message acknowledging the completion of creating the sharper reference image 601' (FIG. 6).

FIG. 7B shows a use image for authentication module that can include processing sequences operable for the following functions with respect to equipment items in accordance with an embodiment of the invention: Subroutine B1 configured to initiate authentication application 605 (FIG. 6) to authenticate an authorized user system access; Subroutine B2 configured to initiate a graphic package 608 (FIG. 6) for a graphic user interface ("GUI") 413 (FIG. 4) to display a message requesting acquisition of authentication image using a vein image capturing device 420 (FIG. 4); Subroutine B3 configured to activate an IR light source 404 (FIG. 4) to direct IR energy towards or onto a vein image capture position 3 (FIG. 1) (e.g. a finger, a wrist section, etc.); Subroutine B4 configured to capture a third image 601 (FIG. 6) of a third vein image capture position 3 associated with the authorized user using a IR camera 403 (FIG. 4) to filter out visible spectrum; Subroutine B5 configured to validate the third image 601 (FIG. 6) to verify that the third image has a clear vein pattern (e.g., a predetermined contrast or resolution of veins in the first image needed for image comparisons); Subroutine B6 configured to use a filtering algorithm (e.g., low pass filter) to remove noise from the third image to create a sharper or higher resolution third image 601' (FIG. 6); Subroutine B7 configured to use a vein pattern recognition algorithm to compare the third image 601' (FIG. 6) with the sharper first image 601' (FIG. 6) stored in a data library 606 (FIG. 6) or through a network service 607 (FIG. 6) received from a transceiver 409 (FIG. 4) to determine a match or no-match where a match indicates a successful authentication of the user; and Subroutine B8 configured to initiate the graphic package 608 (FIG. 6) for generating the GUI 413 (FIG. 4) to display a message acknowledging the completion of authentication of the user.

FIGS. 7C and 7D show a three form authentication module can include processing sequences operable for the following functions with respect to equipment items in accordance with an embodiment of the invention: Subroutine C1 configured to initiate an authentication application 605 (FIG. 6) to authenticate an authorized user system access; Subroutine C2 configured to initiate a graphic package 608 (FIG. 6) for a graphic user interface ("GUI") 413 (FIG. 4) to display a message requesting insertion of a IC card into a card reader 411 (FIG. 4); Subroutine C3 configured to verify the IC card is inserted in the card reader 411 (FIG. 4); Subroutine C4 configured to compare the IC card PM information with user information stored in a data library 606 (FIG. 6) or through the network service 607 (FIG. 6) received from the transceiver 409 (FIG. 4);Subroutine C5 configured to initiate the graphic package 608 (FIG. 6) for the GUI 413 (FIG. 4) to display a message acknowledging completion of successful pairing of the PM information on both the IC card and the user information stored in the data library 606 (FIG. 6); Subroutine C6 configured to initiate the graphic package 608 (FIG. 6) for the GUI 413 (FIG. 4) to display a message requesting a Password or Pin from the user; Subroutine C7 configured to compare the password or the pin with the password or the pin information resided in either the PM information of the IC card, the information stored in the data library 606 (FIG. 6), or through the network service 607 (FIG. 6) received from the transceiver 409 (FIG. 4); Subroutine C8 configured to initiate the graphic package 608 (FIG. 6) for the GUI 413 (FIG. 4) to display a message acknowledging completion of successful pairing of the password information; Subroutine C9 configured to initiate the graphic package 608 (FIG. 6) for the GUI 413 (FIG. 4) to display a message requesting acquisition of an authentication image using a vein image capturing device 420 (FIG. 4);Subroutine C10 configured to activate an IR light source 404 (FIG. 4) to direct IR energy towards or onto a vein image capture position 3 (FIG. 1); Subroutine C11 configured to capture a third image 601 (FIG. 6) of the vein image capture position 3 associated with the authorized user after IR light activation using a IR camera 403 (FIG. 4) to filter out visible spectrum; Subroutine C12 configured to validate the third image 601 (FIG. 6) to verify the third image of vein position 3 (FIG. 1) has a clear vein pattern (e.g., a predetermined contrast or resolution of veins in the first image needed for image comparisons); Subroutine C13 configured to use a filtering algorithm (e.g., low pass filter) to remove noise from the third image to create a sharper or higher resolution third image 601' (FIG. 6) of the vein position 3 (FIG. 1); Subroutine C14 configured to use a vein pattern recognition algorithm to compare the third image 601' (FIG. 6) with the first image 601' (FIG. 6) stored in the data library 606 (FIG. 6) to determine a match or no-match where a match indicates a successful authentication of the user; Subroutine C15 configured to initiate graphic package 608 (FIG. 6) for generating a GUI 413 (FIG. 4) to display a message acknowledging the successful authentication of the user; Subroutine C16 configured to initiate graphic package 608 (FIG. 6) for generating a GUI 413 (FIG. 4) to display a message acknowledging the completion of authentication through the three acknowledgement messages.

FIG. 8 shows a description an overview of simplified software exemplary embodiment with an additional finger-print identification as a two-location biometrics authentication module is shown. This embodiment can include processing sequences operable for the following functions with respect to equipment items in accordance with an embodiment of the invention: Subroutine S1 configured to initiate authentication application 605 (FIG. 6) to authenticate an authorized user system access; Subroutine S2 configured to initiate a graphic package 608 (FIG. 6) for a graphic user interface ("GUI") 413 (FIG. 4) to display a message requesting a first acquisition of an authentication image using a vein image capturing device 420 (FIG. 4); Subroutine S3 configured to activate an IR light source 404 (FIG. 4) to direct IR energy towards or onto a vein image capture position 3 (FIG. 1) from IR light source 404 (e.g. a finger, a wrist section, etc.); Subroutine S4 configured to capture a third image 601 (FIG. 6) of the first vein image capture position 3 associated with an authorized user after IR light activation using a IR camera 403 (FIG. 4) to filter out visible spectrum; Subroutine S5 configured to validate the third image 601 (FIG. 6) to verify that the vein first image has a clear vein pattern (e.g., a predetermined contrast or resolution of veins in the first image needed for image comparisons); Subroutine S6 configured to use filtering algorithm (e.g., low pass filter) to remove noise from the third image to create a sharper or higher resolution third image 601' (FIG. 6);Subroutine S7 configured to use a vein pattern recognition algorithm to compare the third image 601 (FIG. 6) with the stored in a data library 606 (FIG. 6) or through a network service 607 (FIG. 6) received from a transceiver 409 (FIG. 4) to determine a match or no-match where a match indicates a successful authentication of the user; Subroutine S8 configured to initiate the graphic package 608 (FIG. 6) for generating the GUI 413 (FIG. 4) to display a message requesting a second acquisition of authentication image using a camera 402 (FIG. 4);Subroutine S9 configured to capture a fourth image 601 (FIG. 6) of finger print capture position 8 associated with the authorized user in visible spectrum using a camera 402 (FIG. 6) from a second biometrics device 7 (FIG. 1); Subroutine S10 configured to validate the fourth image 601 (FIG. 6) to verify the fourth image has a clear finger print pattern from the second biometrics device 7 (FIG. 1); Subroutine S11 configured to use a finger print recognition algorithm to compare the fourth image with a reference image stored in the data library 606 (FIG. 6) or through the network service 607 (FIG. 6) received from the transceiver 409 (FIG. 4);Subroutine S12 configured to initiate the graphic package 608 (FIG. 6) for generating the GUI 413 (FIG. 4) to display a message acknowledging the completion of authentication of the user.

FIGS. 9A and 9B show an additional finger vein identification as a two-location biometrics authentication module in accordance with an exemplary embodiment of the invention is shown. This embodiment can include processing sequences operable for the following functions with respect to equipment items in accordance with an embodiment of the invention: Subroutine R1 configured to initiate authentication application 605 (FIG. 6) to authenticate an authorized user system access; Subroutine R2 configured to initiate a graphic package 608 (FIG. 6) for generating a graphic user interface ("GUI") 413 (FIG. 4) to display a message requesting a first acquisition of authentication image using a first vein capturing device 420 (FIG. 4);Subroutine R3 configured to activate a first IR light source 404 (FIG. 4) to direct IR energy towards or onto a first vein image capture position 3 (FIG. 1) from IR light source 404 (e.g., a finger, a wrist section, etc.); Subroutine R4 configured to capture a third image 601 (FIG. 6) of the first vein capture position 3 associated with the authorized user after IR light activation using a first IR camera 403 (FIG. 4) to filter out visible spectrum; Subroutine R5 configured to validate the third image 601 (FIG. 6) to verify the third image 601 of the first vein position 3 (FIG. 1) has a clear vein pattern; Subroutine R6 configured to use a filtering algorithm to remove noise to create a sharper or higher resolution third image 601' (FIG. 6) of the first vein position 3 (FIG. 1); Subroutine R7 configured to use a vein pattern recognition algorithm to compare the third image 601' (FIG. 6) with a first reference image 601' (FIG. 6) stored in a data library 606 (FIG. 6) or through a network service 607 (FIG. 6) received from a transceiver 409 (FIG. 4) to determine a match or no-match where a match indicates a successful authentication of the user; Subroutine R8 configured to initiate the graphic package 608 (FIG. 6) for the GUI 413 (FIG. 4) to display a message requesting a second acquisition of authentication image using a second vein capturing device 420 (FIG. 4) with a second vein position 3 (FIG. 1); Subroutine R9 configured to activate a second IR light source 404 (FIG. 4) to direct IR energy towards or onto a second vein image capture position 3 (FIG. 1) from IR light source 404 (e.g., a finger, a wrist section, etc.); Subroutine R10 configured to capture a fourth image 601 (FIG. 6) of the second vein image capture position 3 associated with the authorized user after IR light activation using a second IR camera 403 (FIG. 4) to filter out visible spectrum; Subroutine R11 configured to validate the fourth image 601 (FIG. 6) to verify the second image (FIG. 1) has the clear vein pattern; Subroutine R12 configured to use the filtering algorithm to remove noise to create a sharper or higher resolution fourth image 601' (FIG. 6) of the second vein position 3 (FIG. 1); Subroutine R13 configured to use the vein pattern recognition algorithm to compare the fourth image 601' (FIG. 6) with a second reference image 601' (FIG. 6) stored in the data library 606 (FIG. 6) or through the network service 607 (FIG. 6) received from the transceiver 409 (FIG. 4) to determine a match or no-match where a match indicates a successful authentication of the user; Subroutine R14 configured to initiate the graphic package 608 (FIG. 6) for the GUI 413 (FIG. 4) to display a message acknowledging the completion of authentication of the user FIG. 10 shows an exemplary simplified computer source code representation in accordance with an embodiment of the invention operable to execute, for example, processing such as described herein e.g., with respect to FIG. 7. A Main function F1 is provided which calls an acquire reference image function F2, that executes functions comprising a receive request for acquisition function F3, and a request image function F4, which call two functions that take an image from camera 1 F5 and an image from camera 2 F6; a request test image function F7 then calls two functions that call for test images to be taken from camera 1 F8 and another from camera 2 F9; a image enhancement function F10 then calls for a filter noise function F11, and a sharpen image function F12; a compare image with test image function F13 then calls for a pattern matching function F14; an acknowledge match/no match function F15 then calls for a show result on graphic user interface function F16, which is followed by a save reference image to storage unit function F17; a perform authentication function F18 is then provided which calls for a verify IC card inserted function F19, followed by a request user access data input function F20, followed by a compare user access data function F21, followed by a request image function F22 that executes functions comprising a take image from camera 1 function F23, and a take image from camera 2 function F24; a compare image with reference function F25 then calls for a compare image 1 function F26, a compare image 2 function F27, followed by an acknowledge match/no match function F28, which calls a show result on graphic user interface function F39.

Figure 11:
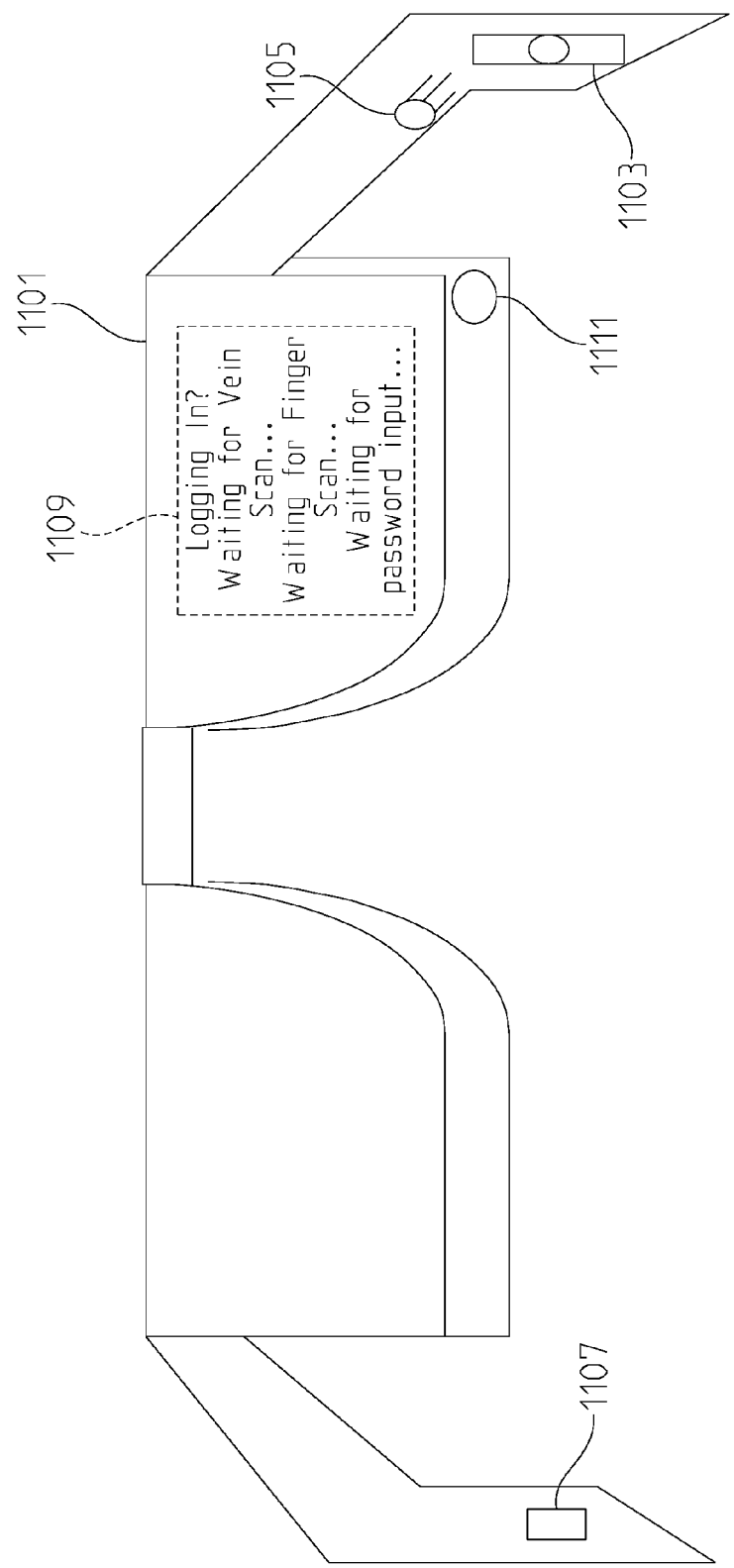
FIG. 11 shows an exemplary biometric device comprising a frame configured to be worn on the head of a user.

FIG. 11 shows an exemplary biometric device comprising a frame configured to be worn on the head of a user 1101. The frame structure can include a first biometric device in the form of a vein capturing device 1103, consisting of an IR camera and an IR light source, positioned on a first free end of a first arm of said frame, wherein vein capturing device 1103 is configured to orient away from said first free end towards a first body section wherein first body section comprises a user's ears. The device structure can also include an IR light source 1105, positioned on the first free end of the first arm of said frame, wherein IR light source 1105 is configured to orient away from said first free end towards said first body section wherein first body section comprises user's ears. The device structure can also include a second biometric device 1107, positioned on a second free end of a second arm of said frame, wherein second biometric device 1107 is configured to orient away from said second free end towards a second body section wherein said second body section comprises a user's head. The device structure can also include an optical head mounted display 1109, positioned on a first axis such that the viewing surface is positioned normal to a line from the viewing surface to a focal center of an eye of the user. The device structure can also include a microphone 1111, affixed to the frame of the device configured to orient away from said display and towards a user's mouth.

Another alternative embodiment can include a structure which positions an embodiment of the invention with respect to a portion of a biological structure e.g. human ear or forehead, top of arm or hand, etc and produces a thermal map which is authenticated against a stored thermal map associated with the biological structure. For example, a head mounted computer system (e.g., glasses or head mounted device), which has an IR scanner and IR emitter positioned on an ear glasses frame support or an ear piece section of glasses along with voice command system and graphical user interface which is mounted on the glasses for displaying graphical information to a user's eye or eyes along with a microphone system, a wireless data interface coupled to the glasses system. In one embodiment, the IR emitter passes or emits light onto or through a section of the user's ear or ears to the IR scanner in order to obtain a vein pattern of the ear section for user authentication. Another embodiment can include an IR scanner coupled to a fiber optic line that is positioned in an earpiece which inserts into a user's ear to capture IR energy from a direction of, e.g., an ear drum. An IR emitter can be positioned outside a user ear and be oriented towards the user's eardrum which then can emit IR energy through an external side of a user's ear which in turn passes IR energy through the user's eardrum and then to the IR scanner and so create a thermal map of the user's eardrum or other internal section of the user's ear.

Another alternative embodiment includes a system that randomly, or at predetermined intervals or times, re-authenticates a user who has maintained contact with at least one of the biometric scanners such as a wrist structure including the IR camera 403 and IR light source 404 wrist by capturing a vein image or biometric scan and comparing such image or scan with stored known-good biometric signatures. In some embodiments, a system can lock out a user from a processing system that does not maintain continuous contact with the biometric scanner. In other embodiments, either separately or in combination thereof, a controller or software can continuously poll the IR camera to determine if contact has been lost and then trigger a response such as, e.g., a system shut down, log-off, or screen lock which then requires the user to re-authenticate and log back it the computer or processing system.

Another alternative embodiment can include a variant that has a safety monitoring subroutine or collection of subroutines that collect operating data such as if a piece of equipment is electrically energized. This safety monitoring subroutine can be executed by a processor along with other instructions. This subroutine can be configured to monitor for a variety of safety related data and then execute a warning or even an automatic equipment shut down to avoid injury or damage to or by a user. For example, the safety monitoring subroutine can track location of a user using visual cues or indicators viewed by a camera in the head mounted display. When a user is viewing a piece of equipment identified by the exemplary invention and determines a user is in a predetermined proximity or is executing displayed instructions eg open an access door, this safety monitoring subroutine can flash a warning eg warning this equipment is electrically energized—back away and denergize this equipment and execute tag and lock out procedures before proceeding. If user continues the system can auto shut down the equipment and flash warnings at a control center eg ship control or maintenance center advising a ship captain and engineering staff of what has occurred.

Although the invention has been described in detail with reference to certain preferred embodiments, variations and modifications exist within the spirit and scope of the invention as described and defined in the following claims.

The invention claimed is:

1. An apparatus comprising:
a first section comprising a first biometric scanner comprising an infrared imager and an infrared wavelength electromagnetic signal source;
a second section comprising a computer processing system user input interface;
a third section comprising a second biometric scanner disposed in a section of said user input interface;
a fourth section comprising a user interface including a display configured to display output including a graphical user interface;
a fifth section comprising a storage section configured to store a plurality of user access data comprising a first, second and third user access data, said first user access data comprising a first biometric signature data comprising a first infrared image data map of a section of an authorized user's first body vein section, said second user access data comprising a second biometric signature data comprising a first fingerprint data, and said third user access data comprising a smart card including an integrated circuit configured for storing an encrypted access signature data including a user password or personal identification data; and
a sixth section comprising a processing system including a processing unit and a non-transitory machine instruction storage section configured to store a plurality of machine readable computer processing system instructions configured to control said processing unit and said first, second, third, fourth, and fifth sections;
wherein said first section is positioned in a first orientation with respect to said second section, said first orientation is along a first axis defined by a first plane that passes through both said first and said second sections, wherein said first section infrared imager and signal source are oriented away from said first plane, said first section is further positioned based on a first distance from a section from said second section to said first section defined based on a first predetermined distance determined based on a predetermined distance from said user's first body vein section to said first section;
wherein said plurality of machine readable computer processing instructions comprise:
a first plurality of machine readable processing instructions configured to request an administrator login password to authorize creation of a reference image, activate said first section and capture an initial reference image of authorized user's first body vein section, and perform image processing to sharpen said initial reference image to produce said reference image of said authorized user's first body vein section;
a second plurality of machine readable computer processing instructions configured to acquire said second infrared image map using said first section to capture said second infrared image map of a wrist area of said user's wrist comprising an infrared map of said user's blood vessel veins acquired by contrasting thermal energy of said veins with surrounding tissue or body sections;
a third plurality of machine readable computer processing instructions configured to compare said first infrared image map with said second infrared image map stored in said storage unit, determine a substantial match or no match;
a fourth plurality of machine readable computer processing instructions configured to acquire and save a second fingerprint data from said second biometric scanner and compare said first fingerprint data with said second fingerprint data to determine a match or no match between said first and second fingerprint data and grant access where a substantial match is determined between said first and second fingerprint data;
a fifth plurality of machine readable computer processing instructions configured to display a prompt for said user to authentication input password or authentication identification data and determine a match with said third user access data;
a sixth plurality of machine readable computer instructions configured to grant access to at least one part of said processing system a match is determined between said first and second infrared image maps, said first and second fingerprint data, and said authentication input password or authentication identification data and said third user data;
executing said plurality of machine readable computer processing instructions on said sixth section to acquire said second infrared image map and grant access to said third section when said substantial match is determined between said first and second infrared image maps is determined.

2. An apparatus as in claim 1, wherein said first section is positioned in a first orientation with respect to said second section, said first orientation is along a first axis defined by a first plane that passes through both said first and second sections, wherein said first section infrared imager and signal source are oriented away from said first plane, said first section is further positioned based on a first distance from a section from said second section to said first section defined based on a first predetermined distance from said user's first body vein section to said first section.

3. An apparatus as in claim 2, wherein said computer processing system user input interface comprises a computer keyboard and a first support configured to position and support said user's wrist in said first orientation.

4. An apparatus as in claim 3, wherein said second section comprises a first, second, and third row of keyboard keys, wherein said support supports said user's wrist to orient and position said user's wrist in proximity to said first biometric scanner and said second section configured to enable said user's fingers to touch at least one key in said first, second, or third row of keyboard keys that has said second biometric scanner disposed therein.

5. An apparatus as in claim 4, wherein said second biometric scanner comprises another infrared imager and another infrared wavelength electromagnetic signal source.

6. An apparatus as in claim 5, wherein said second biometric scanner comprises an imager scanner.

7. An apparatus as in claim 1, wherein said computer processing system user input interface comprises a touchscreen user interface.

8. An apparatus as in claim 1, further comprising a head mounted system comprising a frame comprising a first, second, and third section, said first and third sections are coupled to opposing sides of said second section, said head mounted system is configured to be worn on a head of a user respectively extending around a first, second and third side sections of the user's head and resting on the user's brow and ears, said head mounted system comprises at least one display projector projecting an image onto at least one display surface of an optical element coupled with and extending away from said second section, wherein said first section is coupled with a third biometric scanner comprising another infrared imager and another infrared wavelength electromagnetic signal source that are both oriented away from said first section towards said third section, wherein said third section is coupled with a fourth biometric scanner comprising a fingerprint scanner oriented away from third section and towards said first section.

9. An apparatus as in claim 8, wherein said fingerprint scanner comprises another infrared imager and another infrared wavelength electromagnetic signal source.

10. An apparatus as in claim 9, wherein said fingerprint scanner comprises an image scanner.

11. An apparatus as in claim 10, wherein said head mounted system further comprises a microphone disposed within one of said first, second or third sections.

12. An apparatus as in claim 11, wherein said microphone is disposed on said frame, configured or oriented towards said user's mouth.

13. An apparatus as in claim 1, wherein said encrypted access signature data including a user password or personal identification data comprises a personal identification number or another personal identification data.

14. A method of operating a system for authentication of a user for access to a computer system comprising:
   providing a first section comprising a first biometric scanner comprising an infrared imager and an infrared wavelength electromagnetic signal source;
   providing a second section comprising a computer processing system user input interface;
   providing a third section comprising a second biometric scanner disposed in a section of said user input interface;
   providing a fourth section comprising a user interface including a display configured to display output including a graphical user interface;
   providing a fifth section comprising a storage section configured to store a plurality of user access data comprising a first, second and third user access data, said first user access data comprising a first infrared image map of a section of an authorized user's wrist veins, said second user access data comprising a second biometric signature comprising a first fingerprint data, and said third user access data comprising a smart card comprising an integrated circuit configured for storing an encrypted access signature data including a user password or personal identification data; and
   providing a sixth section comprising a processing system including a processing unit and a non-transitory machine instruction storage section configured to store a plurality of machine readable computer processing system instructions configured to control said processing unit and said first, second, third, fourth and fifth sections;
   wherein said first section is positioned in a first orientation with respect to said second section, said first orientation is along a first axis defined by a first plane that passes through both said first and said second sections, wherein said first section infrared imager and signal source are oriented away from said first plane, said first section is further positioned based on a first distance from a section from said second section to said first section defined based on a first predetermined distance determined based on a predetermined distance from said user's first body vein section to said first section;
   wherein said plurality of machine readable computer processing instructions comprise:
      a first plurality of machine readable processing instructions configured to request for an Administrator login password to authorize creation of a reference image, activate said first section and capture an initial reference image of authorized user's first body vein section, and perform image processing to sharpen said initial reference image to produce said reference image of said authorized user's first body vein section;
      a second plurality of machine readable computer processing instructions configured to acquire a second infrared image map using said first section to capture said second infrared image of a wrist area of said user's wrist comprising an infrared map of said user's blood vessel veins acquired by contrasting thermal energy of said veins with surrounding tissue or body sections;
      a third plurality of machine readable computer processing instructions configured to compare said first infrared image map with said second infrared image map stored in said storage unit, determine a substantial match or no match;
      a fourth plurality of machine readable computer processing instructions configured to acquire and save a second fingerprint data from said second biometric scanner and compare said first fingerprint data with said second finger print data to determine a match or no match between said first and second fingerprint data and grant access where a substantial match is determined between said first and second fingerprint data;

a fifth plurality of machine readable computer processing instructions configured to display a prompt for said user to authentication input password or authentication identification data and determine a match with said third user access data;

a sixth plurality of machine readable computer instructions configured to grant access to at least one part of said processing system a match is determined between said first and second infrared image maps, said first and second fingerprint data, and said authentication input password or authentication identification data and said third user data;

executing said plurality of machine readable computer processing instructions on said sixth section to acquire said second infrared image map and grant access to said third section when said substantial match is determined between said first and second infrared image maps is determined.

15. A method of operating as in claim 14, wherein said second section comprises a computer keyboard and a first support configured to position and support said user's wrist in said first orientation.

16. A method of operating as in claim 15, wherein second section comprises a first, second, and third row of keyboard keys, wherein said support supports said user's wrist to orient and position said user's wrist in proximity to said first biometric scanner and said second section configured to enable said user's fingers to touch at least one key in said first, second, or third row of keyboard keys that has said second biometric scanner disposed therein.

17. A method of operating as in claim 16, wherein said second biometric scanner comprises another infrared imager and another infrared wavelength electromagnetic signal source.

18. A method of operating as in claim 16, wherein said second biometric scanner comprises an imager scanner.

19. A method of operating as in claim 14, wherein said computer processing system user input interface comprises a touchscreen user interface.

* * * * *